United States Patent [19]

Klein

[11] 4,102,828
[45] Jul. 25, 1978

[54] POLYURETHANES DERIVED FROM NOVEL NOVOLAK POLYOLS
[75] Inventor: Howard P. Klein, Austin, Tex.
[73] Assignee: Texaco Development Corporation, New York, N.Y.
[21] Appl. No.: 681,005
[22] Filed: Apr. 28, 1976
[51] Int. Cl.² ............................................. C08G 18/28
[52] U.S. Cl. ....................................... 521/174; 521/73
[58] Field of Search .................. 260/2.5 AP, 77.5 AP, 260/59 EP, 47 EP

[56] References Cited
U.S. PATENT DOCUMENTS

| 3,767,624 | 10/1973 | Clarke | 260/59 EP |
|---|---|---|---|
| 3,817,938 | 6/1974 | Ashida et al. | 260/59 EP |

OTHER PUBLICATIONS

Lesage et al. - Bull. Soc. Chim. Fr. (11) 4147-4151, (1969).

Primary Examiner—Melvyn I. Marquis
Assistant Examiner—H. H. Fletcher
Attorney, Agent, or Firm—Carl G. Ries; Thomas H. Whaley; James L. Bailey

[57] ABSTRACT

Covers a method of producing polyurethanes formed as the reaction product of polyisocyanates and an alkoxylated novolak. Said novolak is the condensation product of a monohydric phenol and a 1,3-dioxane falling within the following structural formula:

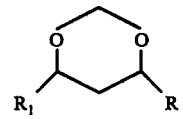

where R is selected from the group consisting of phenyl, substituted phenyl and gem dialkyl, and $R_1$ is selected from the group consisting of hydrogen, alkyl, phenyl, and substituted phenyl. Also covers polyurethanes derived therefrom, and particularly rigid polyurethane foams.

18 Claims, No Drawings

POLYURETHANES DERIVED FROM NOVEL NOVOLAK POLYOLS

BACKGROUND OF THE INVENTION

1. Field of the Invention

This invention relates to the field of polyurethanes. More particularly, this invention relates to the use of particular novolak polyols used in preparing polyurethanes and more particularly, polyurethane foams such as those in rigid form.

2. Description of the Prior Art

Novolak resins of various types have been prepared over a considerable length of time. These include those novolaks prepared from phenol or phenol derivatives and various dioxanes. References to novolaks of this type include Kagan et al, Chem. Abstracts 62, 2889 (1965); Lesage, J. and Peinado, M., Bull. Soc. Chem., France, 1969 (11) 4147-51, "Phenolysis of 4-monosubstituted 1,3-dioxanes"; French Patent No. 1,363,211; British Patent No. 920,413; and J. of Applied Polymer Science, Vol. 8, pp. 1921-1939 (1964). However, to date, novolak resins prepared by utilizing substituted m-dioxanes have not been proposed for use in polyurethanes.

It therefore becomes an object of the invention to provide specific novolak resins as a polyol source useful in preparing polyurethanes.

A specific object of the invention is to provide alkoxylated novolak resins which have low friability, and yet possess other desirable characteristics such as acceptable dimensional strength, humid aging, etc.

Yet another object of the invention is to provide unique polyurethane foams, and particularly rigid polyurethane foams utilizing certain alkoxylated novolaks as the polyol source.

Still further objects in the entire scope of the applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from the detailed description.

SUMMARY OF THE INVENTION

It has now been found that unique polyurethane resins, and particularly those in polyurethane foam form, may be prepared by reacting in the presence of a catalyst or urethane formation and an organic polyisocyanate and a polyol comprising an alkoxylated novolak. The novolak resin provided is the condensation production of a monohydric phenol having at least two reactive hydrogens and a 1,3-dioxane having the formula:

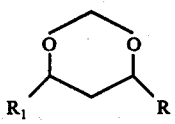

where R is selected from the group consisting of phenyl, substituted phenyl and gem dialkyl, and $R_1$ is selected from the group consisting of hydrogen, alkyl, phenyl and substituted phenyl. The polyurethane materials of the present invention are prepared by mixing a polyisocyanate and an alkoxylated novolak polyol broadly described above, and a polyurethane catalyst, and optionally a blowing agent if foam form is desired. Thus, the polyurethane compositions of the invention can be varied in characteristics from solid elastomer materials through both flexible and rigid cellular materials. The properties of the compositions here can also be varied from soft to hard by altering the components of the mixture as used to form the polyurethane compositions. Where foam is desired, a blowing agent such as water or a volatile organic compound such as fluorocarbons is incorporated into the reaction mixture.

If a solid polyurethane elastomeric material is formed, such material may be used as a coating, gasket, sealant, caulk, recreational surface and the like. The properties of these materials can be varied to suit the particular use to which they are put, for example, a surface which is hard and also scuff resistant can be prepared, and other instances a soft, easily compressed material can be prepared.

Polyurethane foams of the flexible and semiflexible foam type may be made via the process of the invention. Examples of foam use of this type include cushioning for sofas, mattresses, chairs and the like, produced from simple slab stock, flexible foam, or from more complicated molded parts for both utilitarian and decorative purposes.

Again, polyurethane foams may be prepared which are used to absorb shock where relatively large forces are involved. For example, using polyurethane foams prepared here, crash pads in automobiles may be produced from a coated polyurethane material of the type described here. Thus, a crash pad may be produced from a material now known as an integral skin foam prepared from the herein described polyurethanes. These integral skin foams require a tough surface not susceptible to tear and scuffing. Accordingly, it is advantageous for the integral skin material to be provided with a tough outer film or skin to protect the main body of the foam to give the part an attractive appearance.

In like manner high density polyurethane materials may be prepared according to the process of the invention. These may be used as parts for automobiles, trucks and the like in those locations likely to receive a blow as a result of an accident, such as a shock absorbing bumper. In this latter application, the material must have substantial resistance to scuffing and tearing, and also high shock absorbing qualities. Since the vehicles upon which the material may be used are employed in various geographical locations under many extreme ambient conditions of heat and cold, the material must also retain its flexibility without damage or breakage at low temperatures.

The subject matter of the invention is particularly directed to rigid polyurethane foams. Such foams may be used in the construction trade such as in the areas of insulation, decorative and structural paneling, flotation and the like. However, polyurethanes prepared here using the described alkoxylated novolak resins may also be used as elastomers as well as flexible, semi-rigid, semi-flexible and high density flexible foams.

The first component in making the novolak resin here is a monohydric phenol which has at least two reactive hydrogens. Such phenols include among others; phenol, orthocresol, paracresol, 3,5-dimethylphenol, 2,5-dimethylphenol, ortho ethylphenol, para ethylphenol, ortho isopropylphenol, para isopropylphenol, orthopropylphenol, parapropylphenol, orthobutylphenol, parabutylphenol, ortho tertiary butylphenol, para tertiary butylphenol, ortho phenylphenol, para phenylphenol, monohaloparaphenol, monohaloorthophenol and the like. Preferred is phenol itself.

The reactive phenol is then provided and reacted with 1,3-dioxane having the following structural formula:

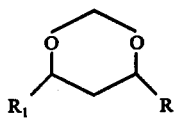

where R is selected from the group consisting of phenyl, substituted phenyl and gem dialkyl and $R_1$ is selected from the group consisting of hydrogen, alkyl, phenyl and substituted phenyl.

The phenol and dioxane are then reacted under conditions similar to those employed in producing more conventional novolak resins. Usually, the mixture is heated at a temperature ranging from about room temperature up to about 150° C. for a period of time ranging from about ¼ to about 5 hours. In order to prevent excessive cross-linking, excess phenol is employed. Normally, the ratio of phenol to dioxane ranges from about 1.1–2.0:1, and more often is 1.1–1.6:1. As usual in the formation of novolaks a trace of mineral acid is used as a catalyst such as hydrochloric acid. Final traces of water may be removed from the novolak resin by utilizing such hydrocarbons as toluene, benzene, and the like to remove last traces of water by azeotropic distillation.

For use in making polyurethanes, the phenoldioxane resins are then alkoxylated. Such resins alone have been found to have limited use as a polyurethane component in that the phenol polyurethane is extremely friable. Generally, the phenol-dioxane resin is alkoxylated 1–10 moles of an alkylene oxide per equivalent OH in said resin. For greatly preferred rigid polyurethane foams, 1–2 moles of alkylene oxide are reacted per equivalent OH of phenol-dioxane resin.

The alkylene oxide used may be ethylene oxide, propylene oxide, butylene oxide or higher alkylene oxides, having up to 18 carbon atoms, and mixtures thereof. When mixed oxides are used, they may be added to the resin either sequentially to form blocked polyether polyols as described in U.S. Pat. No. 3,594,352, or may be mixed and reacted simultaneously to form a random, heteric, oxyalkylene chain. If desired, terminal primary hydroxyl groups can be achieved by reacting ethylene oxide in a last step as described, for example, in U.S. Pat. No. 3,535,307 or 3,336,242. The reaction of the alkylene oxides with the novolak resin is well known to those skilled in the art and occurs under basic conditions established through the use of alkali metals, their hydroxides, oxides, and hydrides, and in some cases, basic amines. Basic catalysts examplary here include potassium or sodium hydroxide, triethanolamines, etc.

As noted above, the polyurethane products are prepared by the reaction of an alkoxylated novolak polyol described here with an organic polyisocyanate. Other additional components may also be present such as chain extending agents, catalysts, surface active agents, foam stabilizers, blowing agents, fillers, and pigments.

The organic polyisocyanates useful in the production of polyurethanes are well known and are a matter of selection by those skilled in the polyurethane art. Examples of such organic polyisocyanates include aromatic or aliphatic polyisocyanates such as diphenyl-4,4,'-triisocyanate, 3,3'-dichloro-4,4-diphenyldiisocyanate, 1,4-tetramethylene diisocyanate, meta- and paraphenylene-diisocyanate, xylene-1,4-diisocyanate, 2,4- and 2,6-toluene diisocyanates, diphenylmethane diisocyanate, paraisocyanatobenzyl isocyanate, etc. and mixtures thereof.

Preferred organic polyisocyanates are the polyfunctional polyaryl isocyanates. The polyaryl isocyanates are produced by the phosgenation of the reaction product of aniline and formaldehyde. Such reactions are well known and are described in U.S. Pat. Nos. 2,683,730; 3,277,173; 3,344,162; and 3,362,797, for example. The polyaryl isocyanates thus formed have functionalities greater than two which can be varied up to the higher functionality materials. In practice, however, functionalities greater than four are attained only with difficulty. However, for the purpose of practicing this invention, materials with a functionality as high as five may be used. It is preferred that the functionality be from two to about four.

If desired, other conventional polyether or polyester polyol may also be used in conjunction with the novolak polyols in making the polyurethane foams here. Illustrative of these one can mention the following types:

(a) Polyoxyalkylene polyols including the adducts of alkylene oxides with, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alphamethylglucoside, triisopropanolamine, ethylenediamine, diethylenetriamine, novolak resins, phosphoric acid, benzenephosphoric acid, polyphosphoric acids such as tripolyphosphoric acid and tetrapolyphosphoric acid, phenol-aniline-formaldehyde ternary condensation products, aniline-formaldehyde condensation products, and the like. The alkylene oxides employed in producing the polyoxyalkylene polyols normally have from 2 to 4 carbon atoms. Propylene oxide and mixtures of propylene oxide with ethylene oxide are preferred. It is known that the random or block structures can be obtained depending upon the particular known procedures used for thier preparation. (b) Polyesters of polyhydric alcohols and polycarboxylic acid such as those prepared by the reaction of an excess of ethylene glycol, propylene glycol, 1,1,1-trimethylolpropane, glycerol, or the like, with phthalic acid, adipic acid, and the like. (c) Lactone polyols prepared by reacting a lactone such as epsilon-caprolactone or a mixture of epsilon-caprolactone and an alkylene oxide with a polyfunctional initiator such as a polyhydric alcohol, an amine, or an amino-alcohol. (d) Phosphorus-containing derivatives such as tris(dipropylene)glycol phosphite and other phosphites.

(e) The polymer/polyols produced by the in situ polymerization of a vinyl monomer in a polyol, as disclosed in U.S. Pat. Nos. 3,304,273, 3,383,351 and 3,523,093.

The foregoing are merely illustrative and represent only a small number of the many polyols known in the art that can be employed along with the novolak polyols described here in the process of this invention.

The amount of polyol compound to be used relative to the isocyanate compound should be such that the isocyanate groups are present in at least an equivalent amount, and preferably, in slight excess, compared with the free hydroxyl groups. Preferably, the ingredients will be proportioned so as to provide from about 1.05 to about 1.5 mol. equivalents of isocyanato groups per mol equivalent of hydroxyl groups.

It is within the scope of the present invention to utilize an extraneously added inert blowing agent such as a gas or gas-producing material. For example, halogenated low-boiling hydrocarbons, such as trichloromonofluoromethane, methylene chloride, carbon dioxide, nitrogen, natural gas, etc., may be used. The inert blowing agent reduces the amount of excess isocyanate and water that is required in preparing flexible urethane foam. For a rigid foam, it is preferably to avoid the use of water and to use exclusively the extraneous blowing agent. Selection of the proper blowing agent is well within the knowledge of those skilled in the art. See, for example, U.S. Pat. No. 3,072,082.

When water is used, the amount of water, based on the hydroxyl compound, is suitably within the range of about 0.05 to about 0.25 mol per mol equivalent of hydroxy compound.

A catalyst is also utilized in forming the polyurethane compositions. Such catalyst which may be present in an amount ranging from about 0.1 percent to about 6 percent, based on the combined weight of the amino polyol and polyisocyanate, may be chosen from a wide variety of materials. Thus, tertiary amines may be used, such as alkylamine, (e.g. triethylamine), heterocyclic amines, such as N-alkylmorpholines (e.g., N-methylmorpholine, N-ethylmorpholine, etc.), 1,4-dimethylpiperazine, triethylenediamine, 2-methyl-triethylenediamine, etc., aliphatic polyamines, such as N,N,N', N', -tetramethyl-1,3-butanediamine and others. Also, organo metallic compounds such as organic tin compounds may be used such as, for example, stannous octoate, stannous oleate, stannous laurate, dibutyltin di-2-ethylhexoate, dibutyltin dibutoxide, and dibutyltin dilaurate. The corresponding lead, zinc, and iron compounds have also been suggested for this use.

Conventional formulation ingredients are also employed, such as, for example, foam stabilizers also known as silicone oils or emulsifiers. The foam stabilizers may be an organic silane or siloxane. For example, compounds may be used having the formula:

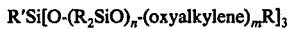

wherein R is an alkyl group containing from one to four carbon atoms; $n$ is an integer of four to eight; $m$ is an integer of 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide the foam by a one-step process. In this instance, water should comprise at least a part (e.g., 10% to 100%) of the blowing agent. The foregoing methods are known to those skilled in the art, as evidenced by the following publication: duPont Foam Bulletin, "Evaluation of Some Polyols in One-Shot Resilient Foams", Mar. 22, 1960.

Another foam method which can be used is the "quasi-prepolymer method". This can be used along with the one-shot process to make rigid foams. In accordance with the quasi-prepolymer method, a portion of the hydroxyl-containing material is reacted in the absence of a catalyst with the polyisocyanate component is proportions so as to provide from about 20% to about 40% of free isocyanato groups in the reaction product, based on the polyol. To prepare a foam, the remaining portion of the polyol is added and the two components are allowed to react in the presence of catalytic systems such as those discussed above and other appropriate additives, such as blowing agents, foam stabilizing agents, etc. The blowing agent (e.g., a halogenated lower aliphatic hydrocarbon), the foam-stabilizing agent, etc., may be added to either the prepolymer or remaining polyol, or both, prior to the mixing of the component, whereby at the end of the reaction a rigid polyurethane foam is provided.

Conventional fire-retardants may also be employed in the preparation of the polyurethane compositions here. These conventional fire-retardants may be of two types. The first of these are those that are incorporated by mere mechanical mixing and include, for example, tris (chloroethyl) phosphate, tris (2,3-dibromopropyl) phosphate, diammonium phosphate, other halogenated compounds and antimony oxide. The second type of fire-retardants are those that become chemically bound in the polymer chain. An example of this type of fire-retardant includes chlorendic acid derivatives.

Elastomers and foams may be made using the novolak polyols described here. Both flexible and rigid foams may be prepared with rigid foams being the preferred foamed product.

The invention will be illustrated further with respect to the following specific examples, which are given by way of illustration and are not to be construed as limitations upon the scope of this invention.

EXAMPLE 1

To a 500 ml. flask, fitted with a stirrer, thermometer, addition funnel and condenser plus Dean-Starke trap, was added 141 g. (1.5 moles) phenol and 1.5 g. (0.015 mole) 38% hydrochloric acid. The resulting mixture was stirred at 45° C. while 165 g. (1.0 mole) of 4-phenyl-1,3-dioxane [4-phenyl-1,3-dioxane was prepared in high yield from styrene and formaldehyde (Org. Synthesis, Coll. Vol. IV, p. 786] was added dropwise causing a slightly exothermic reaction. After the addition, the mixture was heated to 100° C. for 1 hour. Toluene, 50 ml., was added, and the mixture refluxed to remove 20 ml. water by azeotropic distillation. After distillation of toluene the light-yellow, viscous resin was stripped with aspirator vacuum. On cooling, the resinous product was very brittle and could be ground to a fine powder. From nuclear magnetic resonance (NMR) and infrared (IR) spectra, the resin could be assigned the average structure I, shown below:

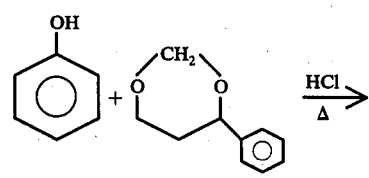

$n = 1-3.$

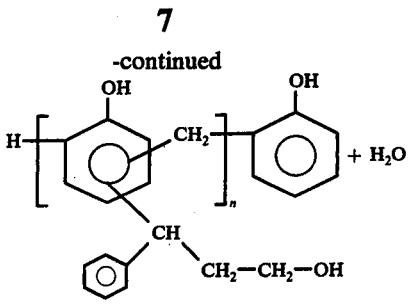

EXAMPLE 2

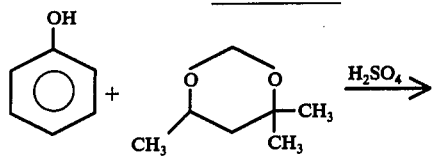

n = 1-3.

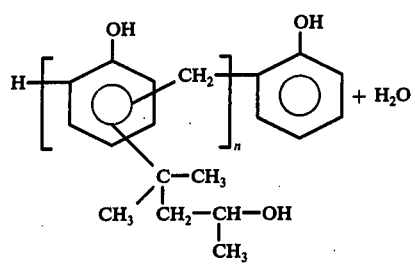

To the apparatus described in Example 1, was added 141 g. (1.5 moles) phenol and 1.5 g. (0.015 mole) conc. sulfuric acid. The resulting mixture was heated to 50° C. and stirred under nitrogen. Then, 130 g. (1.0 mole) 4,4,6-trimethyl-1,3-dioxane* was added dropwise. After the exothermic reaction was complete, the mixture was heated up to 100° C. for 1 hour. Toluene (50 ml.) was added and the mixture refluxed to remove about 20 ml. water. After distillation of toluene, the viscous, purple resin was stripped with an aspirator. When cool, the resin was a brittle, purple solid having the approximate structure (II) as shown above and supported by NMR and IR data.

*Prepared from 2-methyl-2,4-pentanediol and formaldehyde.

EXAMPLE 3

To the apparatus described in Example 1 was added 115 g. (0.70 mole) 4-phenyl-1,3,-dioxane, 94 g. (1.0 mole) phenol and 1.0 g. (0.01 mole) methane sulfonic acid. The resulting mixture was heated up to 90°–100° C. where an exothermic reaction occurs and water began to reflux. Toluene, 50 ml., was added and the mixture refluxed to remove 15 ml. water by azeotropic distillation. After distillation of toluene, the viscous product was vacuum stripped. When cool the product was a lt. orange, brittle resin, having the approximate structure I as shown in Example 1.

EXAMPLE 4

To a one liter, stirred autoclave was added a solution of 180 g. of the resin of Example 3 and 140 g. (1.0 mole) triethanolamine. The mixture was heated under nitrogen at 120° C. while 300 g. (5.2 moles) propylene oxide was added. After a digestion period of 2 hours at 120° C. the autoclave was vented and the product stripped in high vacuum. A total of 487 g. of a clear, brown viscous polyol was recovered. The product had the following analysis:

Hydroxyl no. (meq. KOH/g.) = 464
Total amine (meq./g.) = 1.90
Viscosity (25° C.), cps. = 48,000

EXAMPLE 5

A rigid polyurethane foam of excellent appearance was prepared using the polyol of Example 4. The formulation and reaction times are shown below.

| Formulation, pbw. | |
|---|---|
| Polyol of Example 4 | 39.6 |
| Silicone | 0.5 |
| Freon | 14.0 |
| Polyisocyanate* | 45.9 |
| Reaction Times (sec.) | |
| Cream | 20 |
| Tack free | 77 |
| Rise | 130 |

*Methylene-bridged polyphenyl polyisocyanate mixture - average functionality of 2.7.

EXAMPLE 6

To the apparatus described in Example 1, was added 91 g. (0.70mole) 4,4,6-trimethyl-1,3-dioxane, 94 g. (1.0 mole) phenol and 1.0 g. (0.01 mole) methane sulfonic acid. The resulting mixture was stirred and heated to 90°–100° C., where an exothermic reaction occurred, producing a deep purple viscous resin and water. The water, 20 ml., was removed by azeotropic distillation using toluene. After distillation of toluene, the resin was stripped with aspirator vacuum. When cool, the resin was quite brittle. Its structure was confirmed as that of II by NMR and IR data.

EXAMPLE 7

To a one liter, stirred autoclave was added a solution of 165 g. of the novolak resin from Example 6 and 149 g. (1.0 mole) triethanolamine. The mixture was heated to 120° C. for 1–2 hours. The autoclave was vented and the product stripped in high vacuum to give 400 g. of a dark brown viscous polyol, which had the following analysis:

Hydroxyl no. (meq. KOH/g.) = 477
Total amine (meq./g.) = 2.26
Viscosity (25° C.), cps. = 12,000

EXAMPLE 8

A rigid polyurethane foam of excellent appearance was prepared using the polyol of Example 7. The formulation and reaction times are shown below.

| Formulation | Parts by Weight |
|---|---|
| Polyol of Example 7 | 39.3 |
| Silicone | 0.5 |
| Freon | 13.5 |
| Polyisocyanate of Example 5 | 46.7 |
| Reaction Times | Sec. |
| Cream | 13 |
| Tack free | 60 |
| Rise | 90 |

It is to be understood that the above Examples are given for the purpose of illustration and that a wide variety of polyisocyanates, inert blowing agents, foam stabilizers, surfactants, catalysts, etc. can be used with equal facility employing the novolak polyols herein described, providing that the teachings of the disclosure are followed.

Although the invention has been described in considerable detail in the foregoing disclosure, it is to be understood that many variations can be made by those skilled in the art without departing from the spirit and scope of the invention except as set forth in the claims.

I claim:

1. A method of producing a polyurethane which comprises reacting in the presence of a catalyst of urethane formation and an organic polyisocyanate and a polyol comprising an alkoxylated novolak, which novolak is the condensation product of a monohydric phenol having at least two reactive hydrogens, and a 1,3-dioxane having the formula:

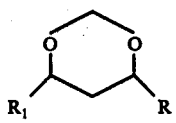

where R is selected from the group consisting of phenyl, substituted phenyl and gem dialkyl, and $R_1$ is selected from the group consisting of hydrogen, alkyl, phenyl, and substituted phenyl.

2. The method of claim 1 wherein said monohydric phenol is phenol.

3. The method of claim 2 wherein said alkoxylated novolak is prepared by reacting per hydroxy equivalent of said novolak 1-10 moles of an alkylene oxide.

4. The method of claim 3 wherein said alkylene oxide is propylene oxide or ethylene oxide.

5. The method of claim 1 wherein R is phenyl and $R_1$ is hydrogen.

6. The method of claim 1 wherein R is gem dimethyl and $R_1$ is hydrogen.

7. The method of claim 1 where R is gem dimethyl and $R_1$ is methyl.

8. The method of claim 1 wherein said organic polyisocyanate and said polyol are reacted in presence of a blowing agent to prepare a polyurethane foam.

9. The method of claim 8 wherein said foam is a rigid polyurethane foam.

10. A polyurethane comprising the reaction product of an organic polyisocyanate and a polyol comprising an alkoxylated novolak, which novolak is the condensation product of a monohydric phenol having at least two reactive hydrogens, and a 1,3-dioxane having the formula:

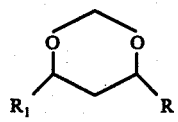

where R is selected from the group consisting of phenyl, substituted phenyl and gem dialkyl, and $R_1$ is selected from the group consisting of hydrogen, alkyl, phenyl, and substituted phenyl.

11. The polyurethane of claim 10 wherein said monohydric phenol is phenol.

12. The polyurethane of claim 11 wherein said alkoxylated novolak is prepared by reacting per hydroxy equivalent of said novolak, 1-10 moles of an alkylene oxide.

13. The polyurethane of claim 12 wherein said alkylene oxide is propylene oxide or ethylene oxide.

14. The polyurethane of claim 10 wherein R is phenyl and $R_1$ is hydrogen.

15. The polyurethane of claim 10 wherein R is gem dimethyl and $R_1$ is hydrogen.

16. The polyurethane of claim 10 wherein R is gem dimethyl and $R_1$ is methyl.

17. The polyurethane of claim 10 prepared in foam form by reacting said organic polyisocyanate and said polyol in the presence of a blowing agent.

18. The polyurethane foam of claim 17 which is in rigid foam form.